Feb. 7, 1939.   H. L. RUSCH   2,145,894
POWER TRANSMISSION DEVICE
Filed Dec. 31, 1935   3 Sheets-Sheet 1

INVENTOR
HUGO L. RUSCH
BY
ATTORNEY

Feb. 7, 1939.                   H. L. RUSCH                   2,145,894
                         POWER TRANSMISSION DEVICE
                          Filed Dec. 31, 1935            3 Sheets-Sheet 2

INVENTOR
HUGO L. RUSCH
BY
ATTORNEY

Feb. 7, 1939. H. L. RUSCH 2,145,894
POWER TRANSMISSION DEVICE
Filed Dec. 31, 1935 3 Sheets-Sheet 3

INVENTOR
HUGO L. RUSCH
BY
ATTORNEY

Patented Feb. 7, 1939

2,145,894

UNITED STATES PATENT OFFICE 2,145,894

POWER TRANSMISSION DEVICE

Hugo L. Rusch, Crestwood, N. Y.

Application December 31, 1935, Serial No. 56,844

17 Claims. (Cl. 192—61)

This invention relates to power transmission devices and more particularly pertains to hydraulically operated power transmission devices.

The present invention provides a hydraulically operated power transmission device capable of functioning as a clutch, and/or as a variable speed transmission and/or as a coupling. The device possesses numerous novel features of construction and arrangement of the several parts thereof and factors of novelty of operation which provide many advantages not heretofore attained in the art. These advantages include the following. The power transmission device is wholly enclosed with no moving parts disposed outside of the enclosure with the exception of the driving and driven shafts which extend into and from the enclosure. The device is readily reversible, that is upon the reversal of direction of rotation of the driving shaft, the direction of rotation of the driven shaft will be automatically reversed without the necessity for adjustments of any character whatsoever. Speed control of the driven shaft with constant angular velocity of the driving shaft is obtained throughout the entire range of driven shaft speeds from zero to maximum for the unit. The speed control is effected by a simple regulation of the fluid flow and pressure produced by a fluid pump forming part of the device. Moreover, any heat energy produced in the operating fluid as a result of speed control is satisfactorily dissipated. The device is compact and this feature together with its complete enclosure permits entirely satisfactory and efficient operation with a minimum volume of operating fluid. The device is also readily portable and is easily installed.

The invention will be understood from the following description considered in connection with the accompanying drawings, forming a part thereof, which illustrate a preferred form of the power transmitting device embodying the present invention.

In the drawings.

Like characters of reference designate the same parts throughout the several views.

Figure 1:
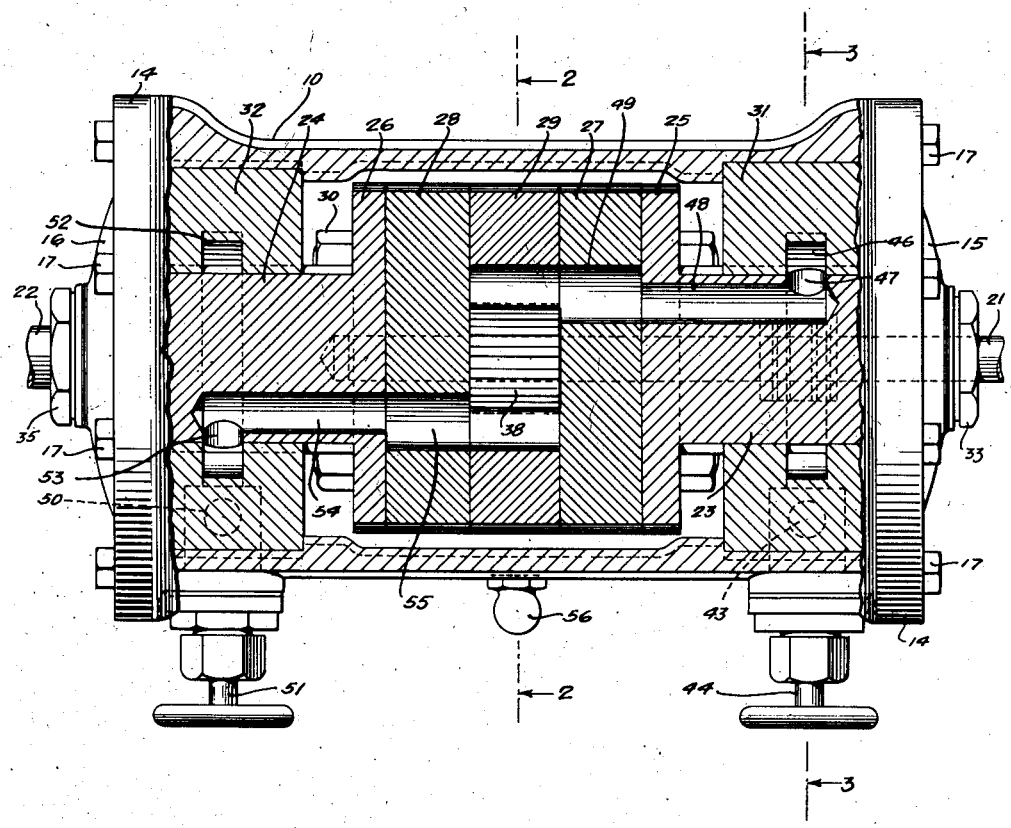
Fig. 1 is a combined plan and sectional view of a preferred form of power transmitting device embodying the invention, the portion in section being taken substantially on line 1—1 of Fig. 2.

Referring to the drawings, reference character 10 designates the housing for the power transmission device which in the form shown is, in general, cylindrical. The housing is provided with a base section 11 having supporting feet 12 at the four corners thereof which support the unit with the bottom wall 13 of the base section 11 in spaced relationship from the member or part to which the device is secured. If desired, these supporting feet may be omitted, in which event, the bottom wall will be disposed in contact with the member on which the device is supported. The open ends of the cylindrical portion of the housing 10 are provided with longitudinally extending peripheral flanges 14 within the confines of which are received end plates 15 and 16 which close the ends of the housing. These end plates are bolted to the housing by a plurality of bolts 17 and suitable gaskets 18 are provided to prevent leakage of fluid from the housing around the end plates.

In the form of the invention selected for illustration the operating parts of the device include a rotor 19, a fluid pump 20 carried by the rotor, a driving shaft 21, a driven shaft 22 and control valves for regulating the fluid flow and pressure of the operating fluid.

The rotor 19 comprises rotor hubs 23 and 24, oppositely disposed with respect to each other and provided with annular flanges 25 and 26 respectively, pump side plates 27 and 28 and a pump cylinder 29. The pump cylinder 29 is disposed as shown between the pump side plates 27 and 28 and these members 27, 28 and 29 are disposed between the rotor hubs 23 and 24. The hubs, side plates and pump cylinder are secured together by a plurality of bolts 30 which extend through the peripheral portions of the members 27, 28 and 29 and through the flanges 25 and 26 of the hub members.

The rotor 19 is rotatably supported in the housing 10 in rotor bearing members 31 and 32 which are disposed in the ends of the cylindrical portion of the housing. The driving shaft 21, connected at its outer end to a prime mover, extends into the housing 10 through a seal 33 on end plate 15, through a packing gland 34 in the rotor hub 23, through member 23, through the pump side plates 27 and 28, through the pump cylinder 29 and into the hub 24 for a short distance as shown. The driving shaft has a bearing in plates 27 and 28 and has a close running fit in all of the members through which it passes with the exception of the pump cylinder 29. The driven shaft 22 is formed in the form shown is formed integrally with the hub member 24. Quite obviously, it may be made separately from the hub member and thereafter secured thereto by any suitable or convenient means. The driven shaft 22 passes through a seal 35 in the end plate 16. The end plates 15 and 16 are provided with annular axially extending flanges 36 and 37 respectively, the annular surfaces of which are designed and disposed to contact lightly the end surfaces of the hub members 23 and 24 of the rotor and thereby limit the amount of axial movement of the rotor in the housing.

In the form of the invention selected for illustration, the means for producing fluid pressure is a rotary pump which is disposed in the rotor and is driven by the driving shaft and is arranged to receive and discharge fluid through passages disposed in the rotor. The pump, designated 20, comprises a driving impeller 38 which is disposed within the confines of the pump cylinder 29 and is keyed to the driving shaft 21 by a key 39, and a driven impeller 40 disposed within the pump cylinder 29 and pressed tightly on an impeller shaft 41 bearing in the pump side plates 27 and 28.

Figure 3:
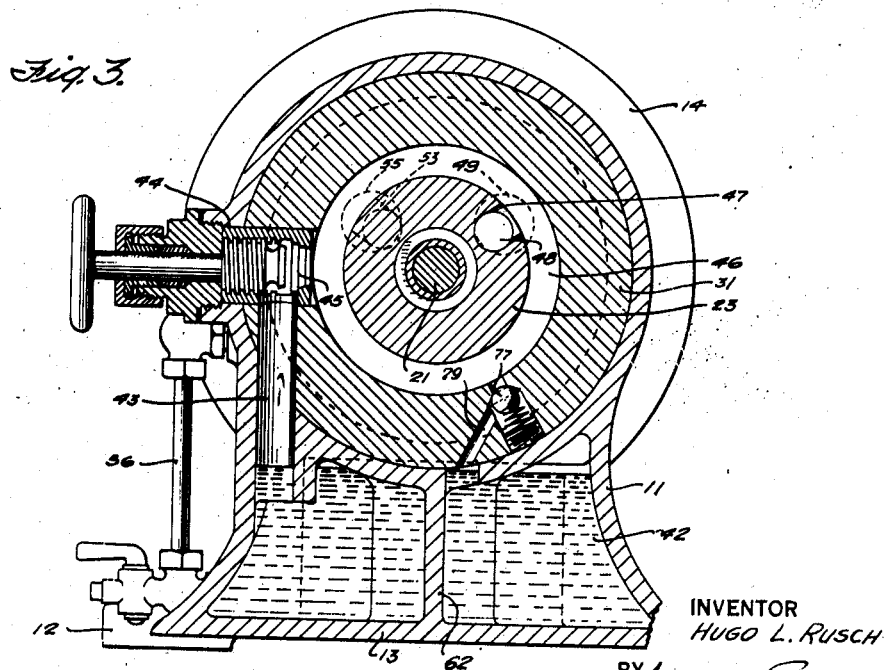
Fig. 3 is another transverse sectional view taken substantially on line 3—3 of Fig. 1.
Figures 4, 5:
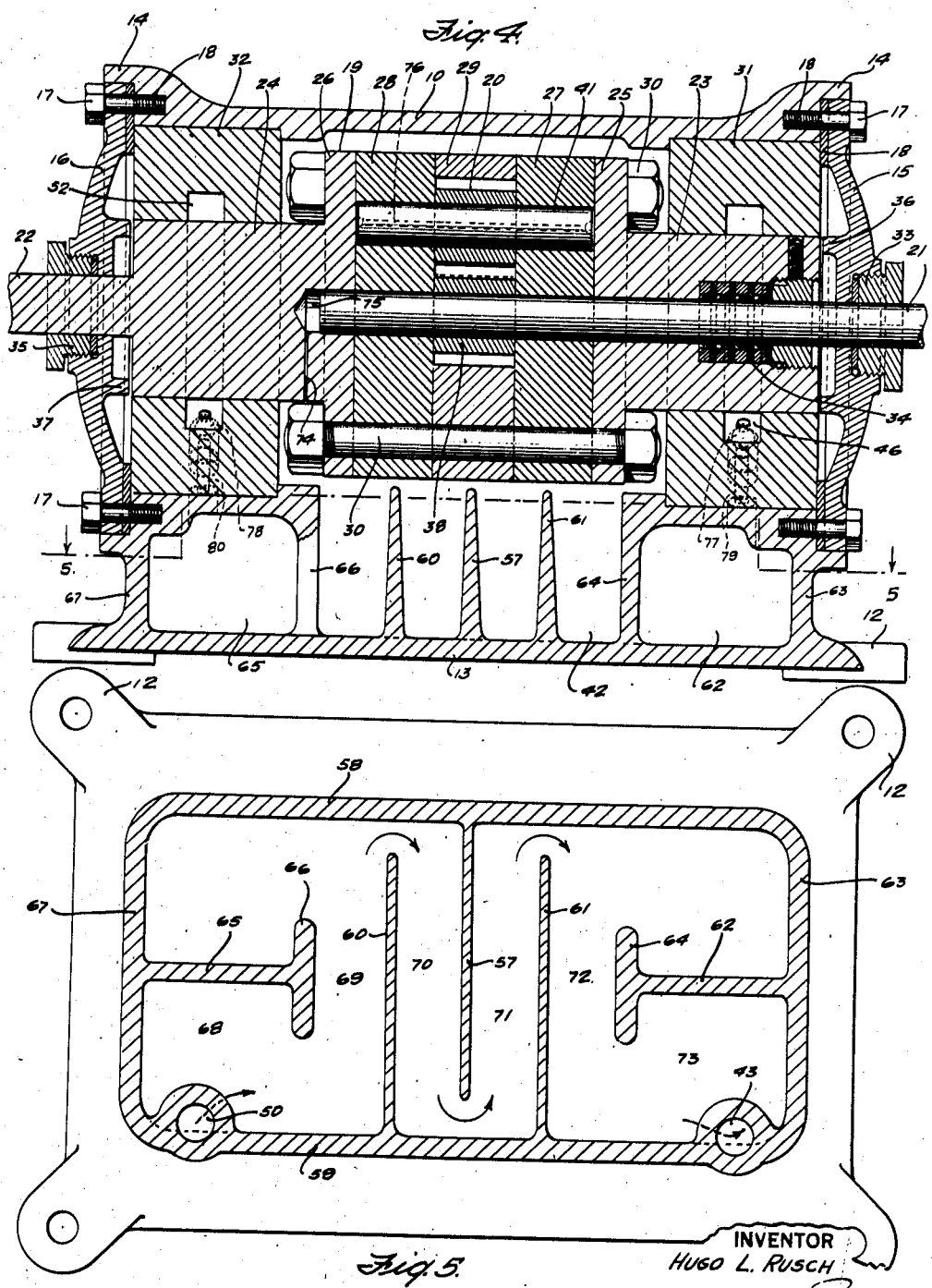
Fig. 4 is a longitudinal sectional view taken substantially on the irregular line 4—4 of Fig. 2.
Fig. 5 is a longitudinal sectional view taken substantially on the irregular line 5—5 of Fig. 4.

The operating fluid for the pump, such as a suitable oil, glycerine or other suitable fluid, is collected in a reservoir 42 in the suporting section 11 of the housing 10 and is normally maintained at the level indicated in Fig. 3 of the drawings. The unit is arranged to permit flow of fluid from the reservoir 42 to the pump 20 and back to the reservoir in such manner that the direction of rotation of the pump, the rotor and the driving and driven shafts may be reversed without requiring any adjustments. The desired action of the device is, of course, obtained by regulating the flow and pressure of the fluid with control valves 44 and 51. The fluid passages for conducting operating fluid from the reservoir to and from the pump 20, in the form shown, pass through the rotor bearing members 31 and 32 and through the rotor itself. Referring to Fig. 3, a vertically extending fluid passage 43 passes through the housing 10 and the bearing member 31 with its lower end disposed below the normal liquid level in the reservoir 42 and with its upper end connecting with a control valve 44 extending radially inwardly of the housing 10 and the bearing member 31. The control valve 44 may be of any form suitable for the purpose intended. Fluid passage 45 in valve 44 connects with an annular fluid passage 46 disposed in the bearing member 31. Passage 46 registers with a radially extending passage 47 in rotor hub 23 which in turn connects with a passage 48 in hub 23 which extends longitudinally of the hub, parallel to but spaced from the axis thereof. The inner end of passage 48 connects with a passage 49 in pump side plate 27 which is of larger flow area than the passage 48. Passage 49 connects at its inner end with the pump 20. A similar system of connecting fluid passages is arranged to conduct operating fluid between the pump 20 and the end of reservoir 42 opposite the end with which fluid passage 43 connects. This similar system includes a vertically extending fluid passage 50 having its lower end disposed below the normal fluid level in reservoir 42 and its upper end connecting with a control valve 51 similar to valve 44. The fluid passage in valve 51 connects with an annular passage 52 disposed in bearing member 32, and registering with passage 52 is a radially extending short passage 53 in hub 24 of the rotor which connects at its inner end with a longitudinally extending passage 54 in this hub member, the inner end of which connects with a passage 55 of larger flow area than passage 54, disposed in pump side plate 28. The passage 55 connects with the rotary pump 20. Passages 47, 48 and 49 are oppositely disposed in the rotor 19 with respect to the passages 53, 54 and 55.

A sight gage 56 disposed at one side of the housing is connected through suitable connections with the reservoir 42 and the interior of the housing 10 to provide visual means for determining the quantity of operating fluid in the reservoir 42.

The base section 11 of the housing 10 is arranged and constructed so as to provide a tortuous or circuitous path of flow of the operating fluid through the reservoir during operation of the power transmitting device in its flow through the reservoir between the fluid passages 43 and 50. In the form shown, the base member 11 is provided with a plurality of webs or partitioning members which direct the flow of operating fluid in its passage through the reservoir. As shown, these webs or partitioning members extend upwardly from the bottom wall 13 of the base section 11 and connect with one of the side walls of the base section. A centrally disposed web 57 extends at right angles from the side wall 58 toward the opposite side wall 59 but terminates somewhat short thereof. Webs 60 and 61 disposed on opposite sides of web 57 extend normally from side wall 59 toward wall 58 but both of these webs terminate short of wall 58. A web 62 extends normally from the central portion of end wall 63 of the base section 11 toward web 61 but terminates short thereof. The inner end of web 62 is provided with an auxiliary web 64 which is formed integrally therewith and extends substantially normally thereof. A web 65 having an auxiliary web 66 extends normally from the central portion of end wall 67 of the base section 11. With this arrangement it will be perceived that operating fluid discharged from vertically extending fluid passage 50, for instance, will flow into compartment 68 of the reservoir into and through compartment 69 and successively through compartments 70, 71, 72 and 73 before it reaches the vertically extending fluid passage 43. Should the direction of rotation of the driving shaft and the pump 20 be reversed, the operating fluid will be delivered to the reservoir through passage 43 and will flow through the before mentioned compartments of the reservoir in reverse order.

A small passage 74 is drilled into hub 24 from the periphery thereof to the cavity 75 in hub 24 at the end of driving shaft 21. This passage prevents any liquid which may travel along shaft 21 from the pump into the cavity from building up a high pressure therein. Any such pressure would tend to force the driving shaft out of the housing, and would also tend to force impeller 38 which is keyed to the driving shaft, against side plate 27. By providing passage 74, the driving shaft and the impeller 28 are balanced in an axial direction and will not be unbalanced by hydraulic pressure.

Impeller shaft 41 has a small hole 76 drilled axially therethrough to prevent hydraulic pressure at either end of this shaft from forcing it against either of the flanges 25 or 26, and also prevents hydraulic pressure on either end of shaft 41 from forcing the impeller on shaft 41 against either of the side plates 27 or 28.

Momentary or continuous overloading of the power transmission device is prevented by providing spring-loaded ball-type relief valves 77 and 78 in bearing members 31 and 32 respectively, which are connected from annular passages 46 and 52 respectively, by passages 79 and 80 into spaces 73 and 68 respectively, in reservoir 42. Whenever the load on the device develops a pressure in either annular passage beyond the setting of the corresponding relief valve the valve will open, and the speed of the driven shaft will drop until the load thereon no longer results in an excess pressure in the passages on the discharge side of the pump. Whenever either of the passages 46 or 52 is on the suction side of the pump, the spring will keep the relief valve closed and prevent the drawing in of air.

Figure 2:
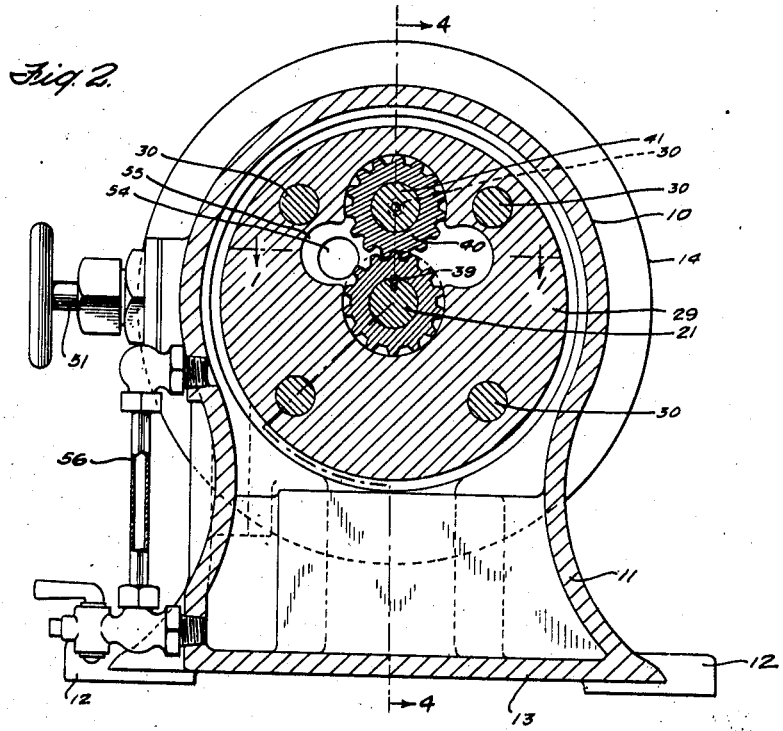
Fig. 2 is a transverse sectional view of the device taken substantially on line 2—2 of Fig. 1.

In operation, assuming that the driving shaft is rotating in a clockwise direction as seen in Fig. 2 and that both control valves 44 and 51 are in fully open position, rotary pump 20 will be operating with impeller 38 rotating in a clockwise direction, as seen in Fig. 2, with impeller 40 rotating in a counterclockwise direction to withdraw operating fluid from reservoir 42 in housing 10 through passages 43, valve 44, passages 45, 46, 47, 48 and 49 into the pump and to discharge the operating fluid through passages 55, 54, 53, through control valve 51 and through passage 50 into the reservoir 42 wherein it flows in the circuitous or devious path heretofore described to the vertically extending passage 43 to complete its circuit through the device. In this instance, due to the relatively small resistance to flow of the operating fluid discharged from the pump, the rotor will ordinarily remain stationary so that maximum differential in speed is obtained between the driving and driven shafts. If now control valve 51 be operated so as to partially restrict the flow of fluid discharged by the pump through the discharge passages 55, 54, 53 and 52, the reaction to the pressure developed in the operating fluid by the pump due to this resistance to flow, will produce a rotary movement of the rotor and driven shaft 22. The extent of such rotary motion or the angular velocity of the rotor and the driven shaft will depend upon the setting of control valve 51 which controls the flow and consequently the pressure and reaction to the pressure developed by the pump in the operating fluid. In other words, the differential of angular velocities of the driving and driven shafts will depend upon the setting of control valve 51, in the instance now being considered, the differential being greatest with valve 51 in completely open position and being the least or almost zero with valve 51 in completely closed position.

Under the operating conditions described, control valve 44, now on the suction side of the pump, may be set to control the rate of flow of the operating fluid from the reservoir into the pump 20. The setting of valve 44 will be selected to further accomplish the desired results in combination with control valve 51. Valve 44 will be regulated for any operating conditions or for any desired speed differential between the driving and driven shafts so that only a limited quantity of fluid is supplied to the pump, thereby limiting the amount of fluid discharged from the pump. By so controlling the rate of flow of fluid into the pump the heat developed in the operating fluid from flow restriction for any given output speed and torque of the device may be maintained at a minimum. This will be clear when it is considered that the heat developed in the operating fluid is a product of two factors, (1) the rate at which fluid is supplied to and delivered by the pump and (2) the pressure of the fluid in the discharge side of the pump. This is particularly important at the lower speeds of the output shaft. The maximum amount of liquid is pumped when the differential speed between driving and driven shafts is a maximum, and the minimum is pumped when the differential is a minimum. By controlling the rate of flow of fluid to the pump so as to maintain the flow at a minimum for the desired operating conditions, the heat developed in the fluid will be maintained at a minimum without reducing the pressure developed in the fluid by the pump and consequently without reducing the developed torque since the torque developed at the driven shaft is directly proportional to the pressure of the fluid in the discharge side of the pump. This control of the rate of flow of fluid to the pump in addition to controlling the flow and pressure of the fluid discharged by the pump is an important factor of the invention. Additionally, the heat produced in the operating fluid is dissipated in the flow of the fluid through the reservoir at the bottom of the unit. This heat is absorbed from the fluid by the housing and the several webs in the reservoir thereof and is dissipated by radiation, conduction and convection from the housing. This cooling effect may be facilitated by virtue of the housing being secured in spaced relationship to the member or device upon which it is supported thereby providing a space through which air circulates.

Entirely satisfactory operation may be obtained by adjustment of the valve controlling the flow of fluid to the pump without adjustment of the valve controlling the flow of fluid from the pump. For example, if inlet valve 44 is gradually closed, with the valve 51 wide open, the pump will create a vacuum on the inlet side of the pump under the operating conditions heretofore described. Since it requires torque and power to create a vacuum, it is apparent that a turning moment will then be exerted on driven shaft 22, under the conditions present. The amount of the torque exerted on the driven shaft will be in direct proportion to the vacuum created. Since the vacuum in any event can never exceed the barometric pressure, and will usually be somewhat less, the amount of torque transmitted to the driven shaft 22 will be correspondingly limited. However, this torque is a definite item, and it is believed no one heretofore has conceived of or utilized this principle in the operation of devices of this type. The use of this principle with discharge valve 51 in a partially closed but fixed position is also very valuable, as will be pointed out hereinafter. Also, the use of independent valves that are independently operated on the inlet and discharge sides of the pump, provides maximum flexibility in obtaining speed variation and control. This combination of valves and the independent controls for the valves, make possible complete reversibility, and permits the use of either shaft 21 or 22 as the driving or driven elements. Assuming now that valve 51 is partially closed, and is maintained at a fixed setting in this partially closed position, if valve 44 on the inlet side of the pump is wide open, a certain speed of the output shaft 22 will be obtained. If valve 44 is then gradually closed, the flow to the pump will be restricted, and less fluid will be delivered to the pump. Since the opening in valve 51 is maintained constant for this particular operating condition, a slight reduction in flow will decrease the pressure on the discharge side of the pump, and the torque as well as the speed of the output shaft 22 will be decreased. In this manner it is possible to obtain speed variations by manipulating inlet valve 44 only, as has been clearly demonstrated by the operation of a full sized device embodying the invention. By manipulating both valves 44 and 51, and operating them independently of each other, a fine degree of speed regulation is obtained and an improvement in performance is obtained, as has heretofore been described.

Due to the symmetry of arrangement of the several parts of the device about a centrally disposed transverse plane, it will be perceived that the device is readily reversible without the necessity for any adjustments. (Of course, it may be desirable to regulate one or both of the control valves for the best speed of operation and the required torque.) Upon reversal of the direction of rotation of the driving shaft, the pump will be reversed and the circulation of operating fluid through the device will be reversed. Since the control valves control the flow of the operating fluid delivered to and discharged by the pump, the same adequate degree of control is provided for the device when operating in reverse direction as when operating in the direction previously described. With this control, regardless of the direction of operation, with a contant speed of rotation of the driving shaft, the driven shaft may be operated at any desired speed of rotation from zero to the maximum speed of the driving shaft with no gaps whatever in the attainable speeds of rotation of the driven shaft. The foregoing description of the operation of the device pertains primarily to its operation as a variable speed transmission. The operation of the device as a hydraulic clutch will also be clear from this description. With control valves 44 and 51 wide open, the driven shaft remains at rest when the driving shaft is rotated by an outside source of power. Assuming that the driving shaft as seen in Fig. 2 is rotated in a clockwise direction, as previously described, and both valves are open, fluid will be discharged from the pump through passages 55, 54, 53 and 52 through valve 51 into reservoir 42, and the driven shaft will be main stationary. As valve 51 is gradually closed, the flow of the fluid from the pump is restricted and a pressure is developed, the result being that the driven shaft begins to rotate. The torque developed at the driven shaft is directly proportional to the pressure developed by the pump, and is dependent upon the reaction to the load on the driven shaft. As the valve 51 is gradually closed, the speed of the driven shaft is increased until a speed equivalent to that of the driving shaft is reached. This is perfect clutch action because the increase in speed of the driven shaft has been accomplished in an almost infinite number of steps. Any difference in the speed of the driving shaft and the driven shaft with valve 51 closed entirely will be due to the fact that the volumetric efficiency of the pump is not 100%, and may also be due to any leakage where hubs 23 and 24 fit in bearing members 31 and 32, respectively.

The transmisison of power from the driving to the driven shaft is accomplished entirely by hydraulic means since there is no mechanical linkage between the two shafts. Consequently, the device may also function as a hydraulic coupling with its numerous advantages over a mechanical coupling. One of the important advantages is the dampening and elimination of any torsional vibrations which would otherwise be transmitted from the driving shaft to the driven shaft. Moreover, this hydraulic coupling prevents the transmitting of sudden shock loads from the driven to the driving shaft.

By reason of the great compactness of the power transmitting device of this invention and its complete enclosure, with the exception of the driving and driven shafts, completely satisfactory and efficient operation is possible with the use of a relatively small quantity or volume of operating fluid. This is due in part to the close disposition of the fluid reservoir to the rotor and the direct passages for conducting operating fluid from the reservoir to and from the pump. The arrangement of the pasasges is such that fluid is free to flow to and from the pump at all times irrespective of any particular position of the rotor.

Inasmuch as changes in the form, location and relative arrangement of the several parts of the power transmitting device selected for illustration and disclosure herein may be made by those skilled in the art without transcending the principles of the invention, it will be understood that no intention is entertained to limit the invention except by the scope of the appended claims.

What is claimed is:

1. A power transmitting device comprising a driving and a driven shaft, a pump driven by the driving shaft to produce fluid flow and pressure, means for controlling the flow of fluid to the pump, means independent of said controlling means for controlling the flow and pressure of the fluid discharged by the pump, and means operated by said fluid flow and pressure produced by the pump for driving the driven shaft.

2. A power transmitting device comprising a driving and a driven shaft, a pump driven by the driving shaft to produce fluid flow and pressure, fluid passages for conducting fluid to and from the pump, means for conducting fluid discharged from one passage to the other passage, said last mentioned means being arranged to cause the fluid passing therethrough to flow in a circuitous path to cool the fluid, means for independently controlling the flow of fluid to and from the pump, and means operated by the fluid flow and pressure produced by the pump for driving the driven shaft.

3. A power transmitting device comprising a housing, a driving and a driven shaft extending into the housing, a fluid pump in the housing driven by the driving shaft, fluid passages for conducting fluid to and from the pump, a fluid reservoir in the housing connected with said passages, means for controlling the flow of fluid to the pump, means independent of said controlling means for controlling the fluid flow and pressure produced by the pump, and means in the housing operated by the fluid pressure produced by the pump for driving the driven shaft.

4. A power transmitting device comprising a housing, a driving and a driven shaft extending into the housing, a fluid pump in the housing driven by the driving shaft, fluid passages for conducting fluid to and from the pump, a fluid reservoir in the housing connected with said passages, means for controlling the flow of fluid to the pump, means independent of said controlling means for controlling the fluid flow and pressure produced by the pump, and means in the housing operated by the fluid pressure produced by the pump for driving the driven shaft, the reservoir being arranged to cause the fluid flowing therethrough from one of said passages to another to flow in a circuitous path to dissipate heat in the fluid.

5. A power transmitting device comprising a housing, a rotor in the housing, a driving shaft extending into the housing and freely rotatable with respect to the rotor, a driven shaft operated by the rotor, a pump supported by the rotor and driven by the driving shaft, passages in the rotor for conducting fluid to and from the pump, a valve for controlling the flow of fluid from the pump, and a separate, independently operated valve for controlling the flow of fluid to the pump.

6. A power transmitting device comprising a housing, a rotor in the housing, a driving shaft extending into the housing and freely rotatable with respect to the rotor, a driven shaft operated by the rotor, a pump supported by the rotor and driven by the driving shaft, passages in the rotor for conducting fluid between the pump and the reservoir, a valve for controlling the flow of fluid from the pump, and a separate independently operated valve for controlling the flow of fluid to the pump, the reservoir being arranged to cause the fluid passing therethrough from one passage to another to flow in a circuitous path to dissipate heat contained in the fluid.

7. A power transmitting device comprising a rotor, a fluid pump supported by the rotor, a driving shaft freely rotatable with respect to the rotor for operating the pump, spaced bearings for the rotor, fluid passages for conducting operating fluid to and from the pump, parts of said passages being disposed in said bearings, and means for independently controlling the flow of fluid to and from the pump to provide variable speeds for the rotor.

8. A power transmitting device comprising a rotor, a fluid pump supported by the rotor, a shaft freely rotatable with respect to the rotor, the pump being arranged and disposed so as to be operated either by the rotor or the shaft, passages for conducting fluid to and from the pump, and means for independently controlling the flow of fluid to and from the pump, whereby upon operation of either the rotor or the shaft, variable speeds of the other are provided.

9. A power transmitting device comprising a rotor, a fluid pump supported by the rotor, a shaft freely rotatable with respect to the rotor, the pump being arranged and disposed so as to be operated either by the rotor or the shaft, passages for conducting fluid to and from the pump, and means for controlling the flow of fluid to the pump independently of the flow of fluid from the pump, whereby upon operation of either the rotor or the shaft, variable speeds of the other are provided.

10. A power transmitting device comprising a rotor, a fluid pump supported by the rotor, a shaft extending into and freely rotatable with respect to the rotor, the pump being arranged and disposed so as to be operated by either the rotor or the shaft to produce fluid flow and pressure, means for controlling the flow of fluid to the pump, means independent of said controlling means for controlling the flow and pressure of the fluid discharged by the pump, the operation of the pump resulting in leakage along the shaft toward the inner end thereof producing an end thrust tending to force the shaft out of the rotor, and means to prevent said end thrust.

11. A power transmitting device comprising a rotor, a gear pump supported by the rotor, a main shaft extending into and freely rotatable with respect to the rotor, one of the gears of the pump being fixed to said shaft, the second gear of the pump being mounted on a second shaft supported by the rotor, the pump being arranged and disposed so as to be operated by either the rotor or the main shaft to produce fluid flow and pressure, means for controlling the flow of fluid to the pump, means independent of said controlling means for controlling the flow and pressure of the fluid discharged by the pump, the operation of the pump resulting in leakage along said second shaft tending to produce unbalanced end thrust on said second shaft and gear, and means for equalizing the thrust on the ends of the second shaft and gear.

12. A power transmitting device comprising a housing, a rotor in the housing, a driving shaft extending into the housing and freely rotatable with respect to the rotor, a pump supported by the rotor and arranged and disposed so as to be operated either by the rotor or the shaft, passages in the rotor for conducting fluid to and from the pump, a valve for controlling the flow of fluid from the pump, and another independently operable valve for controlling the flow of fluid to the pump.

13. A power transmitting device comprising a rotor, a fluid pump supported by the rotor, a driving shaft freely rotatable with respect to the rotor for operating the pump, a bearing for the rotor, and a passage for conducting operating fluid under pressure to or from the pump, means for controlling the flow of fluid to the pump, means independent of said controlling means for controlling the flow of fluid from the pump, part of said passage being disposed in the bearing, said bearing being arranged to provide sufficient bearing surface area on at least one side of the passage therein to provide adequate sealing surface to prevent harmful leakage from said passage, whereby a packing gland is rendered unnecessary.

14. A power transmitting device comprising a rotor, a fluid pump supported by the rotor, a driving shaft freely rotatable with respect to the rotor for operating the pump, a bearing for the rotor, and a passage for conducting operating fluid under pressure to or from the pump, means for controlling the flow of fluid to the pump, means independent of said controlling means for controlling the flow of fluid from the pump, part of said passage being disposed in the bearing, said bearing being arranged to provide sufficient bearing surface area on both sides of the passage therein to provide adequate sealing surfaces to prevent harmful leakage from said passage, whereby a packing gland is rendered unnecessary.

15. A power transmitting device comprising a rotor, a fluid pump supported by the rotor, a shaft extending into and freely rotatable with respect to the rotor, the pump being arranged and disposed so as to be operated either by the rotor or the shaft, the rotor comprising a pump cylinder, pump side plates at opposite sides of the pump cylinder, and rotor hubs adjacent each pump side plate, bearing members for the rotor hubs, and fluid passages extending through the pump side plates of the rotor to conduct fluid to and from the pump, the rotor being substantially symmetrical with respect to the centrally disposed pump cylinder whereby the direction of rotation of the rotor may be reversed.

16. A power transmitting device comprising a rotor, a fluid pump supported by the rotor, a shaft extending into and freely rotatable with respect to the rotor, the pump being arranged and disposed so as to be operated either by the rotor or the shaft, the rotor comprising a pump cylinder, pump side plates at opposite sides of the pump cylinder, and rotor hubs adjacent each pump side plate, bearing members for the rotor hubs, fluid passages extending through the pump side plates of the rotor to conduct fluid to and from the pump, the rotor being substantially symmetrical with respect to the centrally disposed pump cylinder whereby the direction of rotation of the rotor may be reversed, fluid passages in the bearing members communicating with the fluid passages in the rotor, means for controlling the flow of fluid to and from the pump, and a fluid reservoir for supplying fluid to and receiving fluid from said passages.

17. A power transmitting device comprising a housing, a rotor supported on spaced bearings in the housing, a fluid pump carried by the rotor, a shaft extending into and freely rotatable with respect to the rotor, the pump being arranged and disposed so as to be operated either by the rotor or the shaft, the pump being disposed in the central portion of the rotor, fluid passages extending through the rotor and said bearings, the rotor and fluid passages therein being substantially symmetrical with respect to the pump, valves for controlling the flow of fluid through said passages to and from the pump, a fluid reservoir in the housing communicating with said fluid passages, and means in the reservoir to cause the fluid to flow therethrough in a circuitous path to cool the fluid.

HUGO L. RUSCH.